United States Patent
Dewaele

(10) Patent No.: US 9,546,757 B2
(45) Date of Patent: *Jan. 17, 2017

(54) SUPPORT STRUCTURE FOR AN ARTICLE, METHOD OF MOUNTING THE SUPPORT STRUCTURE, AND SUPPORT BRACKET

(71) Applicant: Barco N.V., Kortrijk (BE)

(72) Inventor: Tom Adriaan Gerard Dewaele, Kapellen (BE)

(73) Assignee: Barco NV, Kortrijk (BE)

( * ) Notice: Subject to any disclaimer, the term of this patent is extended or adjusted under 35 U.S.C. 154(b) by 0 days.

This patent is subject to a terminal disclaimer.

(21) Appl. No.: 14/851,491

(22) Filed: Sep. 11, 2015

(65) Prior Publication Data

US 2016/0003411 A1   Jan. 7, 2016

Related U.S. Application Data

(63) Continuation of application No. 14/364,101, filed as application No. PCT/EP2012/073701 on Nov. 27, 2012, now Pat. No. 9,133,979.

(30) Foreign Application Priority Data

Dec. 12, 2011   (GB) .................................. 1121270.1

(51) Int. Cl.
*A47B 96/00*   (2006.01)
*F16M 13/02*   (2006.01)
(Continued)

(52) U.S. Cl.
CPC .......... *F16M 13/022* (2013.01); *A47G 1/1686* (2013.01); *F16B 2/005* (2013.01);
(Continued)

(58) Field of Classification Search
CPC .... F16M 13/02; F16M 11/045; F16M 11/046; G09F 9/30; G09F 7/18; A47G 1/1686
(Continued)

(56) References Cited

U.S. PATENT DOCUMENTS 2,614,701 A   10/1952   Mapson
3,574,964 A   4/1971   Ownbey
(Continued)

FOREIGN PATENT DOCUMENTS

DE   43 21 708 A1   1/1995
EP   2 369 219 A2   9/2011
(Continued)

OTHER PUBLICATIONS

International Search Report for corresponding patent application No. PCT/EP2012/073701 dated Feb. 22, 2013.
(Continued)

*Primary Examiner* — Gwendolyn Baxter
(74) *Attorney, Agent, or Firm* — Renner, Otto, Boisselle and Sklar LLP

(57) ABSTRACT

The invention relates to a support structure for an article. In particular, the invention relates to a support structure for mounting modular articles such as display units and the like upon a wall. The support structure comprises a support bracket (1), the support bracket having at least one opening (15), the opening being sized to accommodate a fixing (4) by which the support bracket may be secured to a wall (3), the opening being larger than the fixing whereby the position of the support bracket (1) may be adjusted relative to the fixing (4). The support structure also comprises a support element (2), the support element having a dimension (d) which is larger than the opening (15), the support element having a fixing hole (14) therethrough, the distance between the fixing hole (14) and the periphery of the support element (2)

(Continued)

being non-uniform. The support bracket (1) has a support surface (12) adapted for engagement by the periphery of the support element (2). The invention also provides a method of mounting the support structure, and a support bracket for use in the structure and method.

18 Claims, 6 Drawing Sheets

(51) Int. Cl.
| | | |
|---|---|---|
| *F16M 11/04* | (2006.01) | |
| *G09F 9/30* | (2006.01) | |
| *G09F 7/18* | (2006.01) | |
| *A47G 1/16* | (2006.01) | |
| *F16B 2/00* | (2006.01) | |
| *F16B 23/00* | (2006.01) | |

(52) U.S. Cl.
CPC ........... *F16B 23/00* (2013.01); *F16M 11/045* (2013.01); *F16M 11/046* (2013.01); *F16M 13/02* (2013.01); *G09F 7/18* (2013.01); *G09F 9/30* (2013.01)

(58) Field of Classification Search
USPC .............. 248/222.51, 222.52, 223.31, 224.7, 248/231.91, 225.11; 211/94.01, 94.02
See application file for complete search history.

(56) References Cited

U.S. PATENT DOCUMENTS

| | | | |
|---|---|---|---|
| 4,500,943 A | 2/1985 | Greene | |
| 4,589,557 A | 5/1986 | Bollmann | |
| 5,101,989 A * | 4/1992 | Jones | .................... A47F 5/0846 |
| | | | 211/94.01 |
| 6,945,414 B1 | 9/2005 | Stevens et al. | |
| 8,267,363 B2 | 9/2012 | Begic et al. | |
| 9,133,979 B2 * | 9/2015 | Dewaele | ................ F16M 13/02 |
| 2005/0247654 A1 * | 11/2005 | Walker | .................. A47F 5/0846 |
| | | | 211/94.01 |

FOREIGN PATENT DOCUMENTS

| | | |
|---|---|---|
| FR | 2 276 019 A1 | 1/1976 |
| GB | 2 427 119 A | 12/2006 |

OTHER PUBLICATIONS

Response filed Oct. 13, 2013 in response to International Search Report and Written Opinion dated Feb. 22, 2013 for corresponding patent application No. PCT/EP2012/073701.
Response filed Jan. 30, 2014 in response to Written Opinion dated Dec. 9, 2013 for corresponding patent application No. PCT/EP2012/073701.

* cited by examiner

US 9,546,757 B2

SUPPORT STRUCTURE FOR AN ARTICLE, METHOD OF MOUNTING THE SUPPORT STRUCTURE, AND SUPPORT BRACKET

This application is a continuation of application Ser. No. 14/364,101 filed Jun. 10, 2014, that is a National Stage entry of Application No. PCT/EP2012/073701 filed Nov. 27, 2012, that claims priority of Application No. GB1121270.1 filed Dec. 12, 2011, all of which are hereby incorporated herein by reference.

FIELD OF THE INVENTION

The invention relates to a support structure for an article, to a method of mounting the support structure, and to a support bracket for use in the support structure and the method. In particular, the invention relates to a structure and method for supporting modular articles such as display units and the like, and in particular the mounting of such articles upon a wall. The following description will relate primarily to such applications, but it will be understood that the invention can be used for other applications also.

BACKGROUND TO THE INVENTION

As above indicated, the present invention relates in particular to a support structure for use in the mounting of articles such as display units (e.g. LED, CRT or plasma televisions) upon a wall. In such applications the wall will typically be a fixed structure made of bricks, blocks or the like. The word "wall" as used in this patent specification is to be interpreted more broadly that this, however, and comprises any permanent or temporary surface upon which the article is to be mounted. In some applications, the wall will be a panel or set of panels which have been erected for the purpose of accommodating the article.

In order to mount an article upon a wall using the present support structure, it is necessary to form a plurality of holes into the wall, suitably by drilling, into which respective fixings such as a screws or the like can be passed whereby to locate and secure the support structure.

It is known to be difficult to drill a hole at a precise position in a wall, particularly a wall made of bricks or concrete. The drill which is used to form the hole will often be held by hand, and it is known for the drill bit to deviate or wander from the chosen location during the drilling operation. Often, there will be a deviation of the drill bit due to inaccuracy of alignment of the drill, and/or differences in the composition of the wall.

The misalignment of drilled holes in the wall is exacerbated when a plurality of holes have to be drilled, with the position of each hole within an array of holes being predetermined. The requirement to drill an accurate array of holes is a typical requirement for mounting a large or heavy article such as a television, since a single fixing will typically not be able to support the weight of the article.

A large array of holes is typically required to support modular articles. The mounting of modular articles upon a wall typically requires greater accuracy for the holes since the respective modular articles are separate and are typically required to be accurately mounted relative to the adjacent articles. Since the articles themselves are typically not directly interconnected, the support structure(s) must be accurately mounted upon the wall in order to provide the accurate positioning of each of the modular articles.

Display articles such as flat screen televisions are often mounted in a modular array so as to provide large-area displays for public broadcasts and the like. With modular displays such as this the relative positioning of adjacent televisions is critical to the viewer's enjoyment, as the image provided by each television must be properly aligned with its neighbours. It is not possible to overlap adjacent televisions, and any significant gaps between adjacent televisions will be readily apparent and detrimental to the displayed image.

If the wall upon which the modular articles are mounted is made of bricks, blocks or concrete, it is rare that the wall will be totally flat. The uneven surface of the wall is another factor making the correct alignment of the modular articles more difficult to achieve in practice.

The requirement for the correct alignment of drilled holes is widely known, and the manufacturers of mounting structures will typically seek to overcome the problems outlined above. Shelf brackets and the like will typically require an array of drilled holes which must be positioned correctly and accurately relative to one another, and it is known to provide openings in the brackets which are larger than the fixings in order to allow some adjustment in the position of a shelf bracket, in order to overcome any wrongly positioned drilled hole.

The manufacturers of modular structures such as display stands also face the problem of the correct alignment of the respective parts of the modular structure. WO2011/012286 by the present applicant provides a spacer plate for interconnecting respective support profiles of a display structure, the spacer plate allowing adjustment of adjacent profiles so as to better ensure that they can be properly aligned.

US patent application 2008/0083865 discloses a support structure for mounting a single article, specifically a flat screen television, upon a wall. The correct positioning of the drilled holes is a pre-requisite for the accurate mounting of the television, and the disclosure includes the use of a template to identify the position of each of the fixing holes. There is no disclosure of any means to compensate for a hole which is drilled away from its predetermined position.

Another known method of aligning an array of articles requires the adjustment of each individual article relative to its neighbours. Typically, an installer will mount all of the articles in the array and will fix a chosen one of the articles (often a corner article) in position upon the support structure. The installer will then adjust the position of an adjacent article relative to the fixed article, and when properly adjusted will fix that article in position. The requirement to adjust sequentially each of the articles in this manner is time consuming even for a skilled installer, and an unskilled installer cannot always achieve the accuracy required.

U.S. Pat. No. 8,007,121 addresses the problem of aligning adjacent articles in a modular array. The solution offered by this patent is to interconnect each pair of adjacent articles by way of respective clips. The clips add substantial cost and complexity to the support structure, and significantly increase the time taken to assemble the array of articles.

SUMMARY OF THE INVENTION

It is an object of the present invention to provide a mechanical solution which facilitates the mounting of a support structure for an article in an adjustable manner. It is another object of the invention to provide adjustment in the position of parts of a support structure which is sufficient to permit the accurate mounting of an article in a predetermined location. It is a further object of the invention to enable the accurate alignment of the support bracket(s) of a support structure, and the securement of the support bracket(s) upon a wall, in substantially one single operation. It is yet a further object of the invention to provide a support structure and method which are relatively simple and straightforward to use, whereby a person with little or no experience can easily and accurately mount the support structure upon a wall. It is yet another object of the present invention to permit the accurate mounting of an array of articles without requiring the direct interconnection of the articles.

According to the invention there is provided a support structure, comprising:

a support bracket, the support bracket having at least one opening, the opening being sized to accommodate a fixing by which the support bracket may be secured to a wall, the opening being larger than the fixing whereby the position of the support bracket may be adjusted relative to the fixing;

a support element, the support element having a dimension which is larger than the opening, the support element having a fixing hole therethrough, the distance between the fixing hole (and the periphery of the support element being non-uniform;

the support bracket having a support surface adapted for engagement by the periphery of the support element.

The support element acts as firstly as a "washer" between the fixing and the support bracket, the support element spanning the opening in the support bracket and permitting the fixing to secure the support bracket to the wall. The fact that the opening is larger than the fixing permits the position of the support bracket to be adjusted relative to the wall before the fixing is tightened. Incorrect positioning of the (drilled) hole in the wall, which might be caused by deviation of the drill bit for example, can thereby be compensated for.

Unlike a conventional washer, however, the support element also serves to directly support the support bracket by way of the support surface. Accordingly, during fitment of the fixing, the support element is positioned so that its periphery engages the support surface. The periphery of the support element remains in engagement with the support surface after the fixing has been fully tightened.

The invention facilitates the accurate mounting of several separate support brackets upon a wall, or the accurate mounting of separate parts of a single support bracket, or the accurate mounting of a network of support brackets, as the case may be. The accurately mounted support bracket(s) can accommodate modular articles such as an array of display units or the like.

The support bracket(s) can include one or more rails, channels or formations adapted for the direct mounting of an article, or can include the necessary elements to permit the mounting of an intermediate carrier upon which the article is subsequently mounted. Whether the article is mounted directly upon the support structure(s), or is mounted indirectly by way of an intermediate carrier, will depend upon the article being mounted.

Preferably, the support element is substantially circular. Alternatively, the support element is polygonal, for example octagonal, or is elliptical or oval.

Desirably, the support surface is provided by a channel in the support bracket, the channel having a secondary surface spaced from the support surface. The separation between the support surface and the secondary surface can match a dimension of the support element whereby the periphery of the support element engages the support surface and the secondary surface in use. In embodiments in which the support element is circular the periphery of the support element can engage the support surface and the secondary surface regardless of the orientation of the support element. In embodiments in which the support element is not circular the periphery of the support element may not engage the secondary surface is use.

Typically, the support surface will be substantially horizontal in use.

Because the fixing hole through the support element is offset relative to the periphery of the support element, it will be understood that the orientation of the support element affects the distance between the fixing hole (and thereby the fixing) and the support surface. Adjusting the orientation of the support element can thereby adjust the position of the support bracket relative to the fixing. In the typical arrangement in which the support surface is substantially horizontal this can permit the accurate adjustment of the support bracket in the vertical direction (or in the direction of the y-axis).

In addition, adjusting the orientation of the support element can adjust the position of the support bracket in the horizontal direction parallel to the wall (or in the direction of the x-axis). The relatively large opening in the support bracket also permits adjustment of the support bracket in this horizontal direction.

The position of the support bracket can also be adjusted in the z-direction, i.e. the direction perpendicular to the plane of the wall, by fitting spacers between the support bracket and the wall. It is known that walls are rarely flat, and means are preferably provided to mount the (planar) support bracket upon the wall regardless of any unevenness of the wall surface. The spacers are used to fill the gaps which will typically occur between the support bracket and the wall, and enable the full tightening of the fixings without causing unwanted distortion of the support bracket.

The support bracket is ideally an extrusion, and is cut to the desired length in order to accommodate the article or array of articles. Alternatively, if the array of articles is particularly large, the support bracket can include at least one alignment channel which can accommodate an alignment member. In use, the alignment member can span the junction between the alignment channels of adjacent support brackets and act to align the adjacent support brackets.

There is also provided a method of mounting a support structure to a wall, the method comprising the steps of:

{i} providing a support bracket, the support bracket having at least one opening, the at least one opening being sized to accommodate a fixing by which the support bracket may be secured to the wall, the at least one opening being larger than the fixing whereby the position of the support bracket may be adjusted relative to fixing, the support bracket having a support surface adjacent to the opening;

{ii} providing a support element for the at least one opening, the support element having a dimension which is larger than the opening, the support element having a fixing hole therethrough, the distance between the fixing hole and the periphery of the support element being non-uniform;

{iii} forming a number of holes in the wall substantially at predetermined positions;

{iv} locating the support bracket upon the wall, with the at least one opening overlying a respective hole;

{v} locating the support element adjacent to the support bracket with the fixing hole aligned with the opening, and with the periphery of the support element engaging the support surface;

{vi} passing a fixing through the fixing hole and into a respective formed hole and partially tightening the fixing;

{vii} rotating the support element around the fixing whereby to adjust the position of the support bracket in the plane parallel to the wall; and {viii} tightening the fixings to secure the support bracket to the wall.

Preferably, the method includes the additional step of fitting at least one spacer between the support bracket and the wall whereby to fill any gap therebetween. Preferably also, said at least one spacer is fitted adjacent to the location of a fixing.

Desirably, the method is repeated for subsequent support brackets whereby to form an array or network of support brackets. The array of support brackets may be separate and positioned at predetermined spacings, or may be interconnected.

The method can be used for mounting a single article, but is preferably used for the mounting of an array of separate, modular, articles.

BRIEF DESCRIPTION OF THE PREFERRED EMBODIMENTS

The invention will now be described in more detail, by way of example, with reference to the accompanying drawings, in which.

Figure 4:
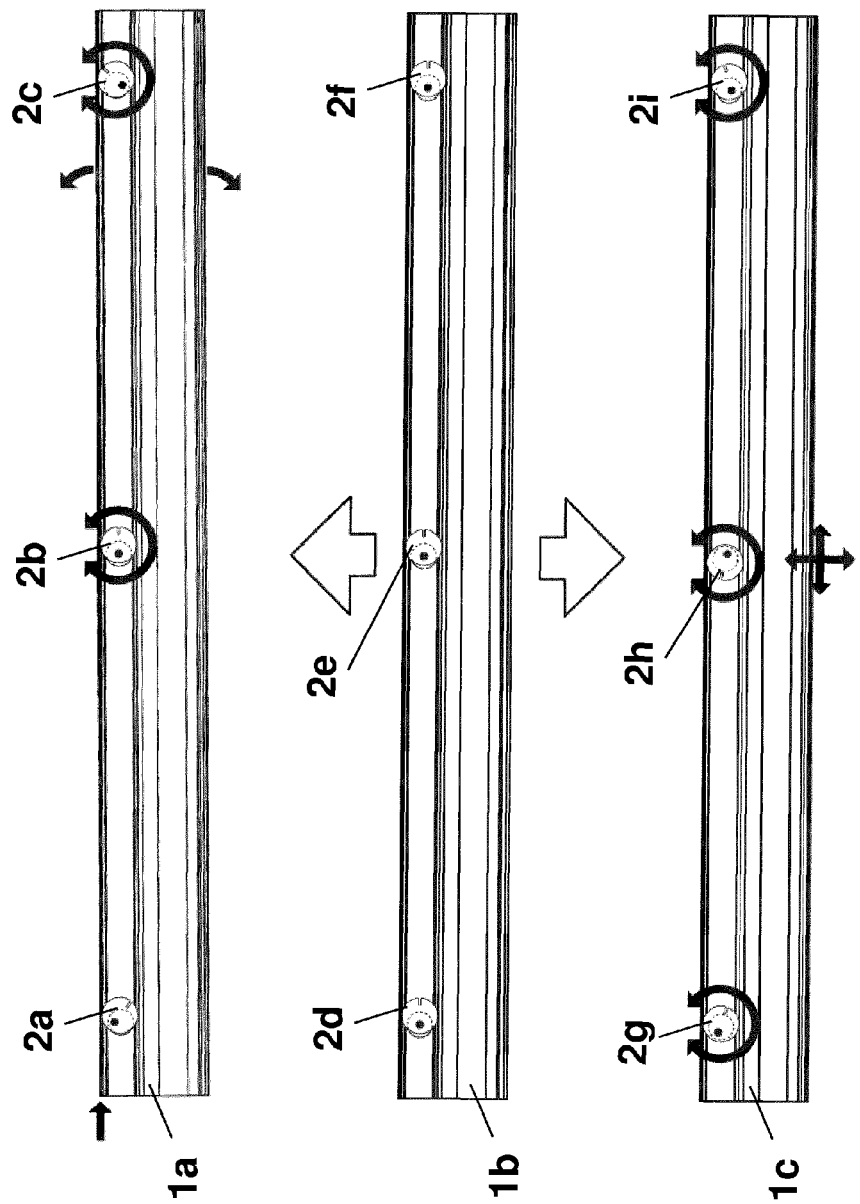
Figure 5:
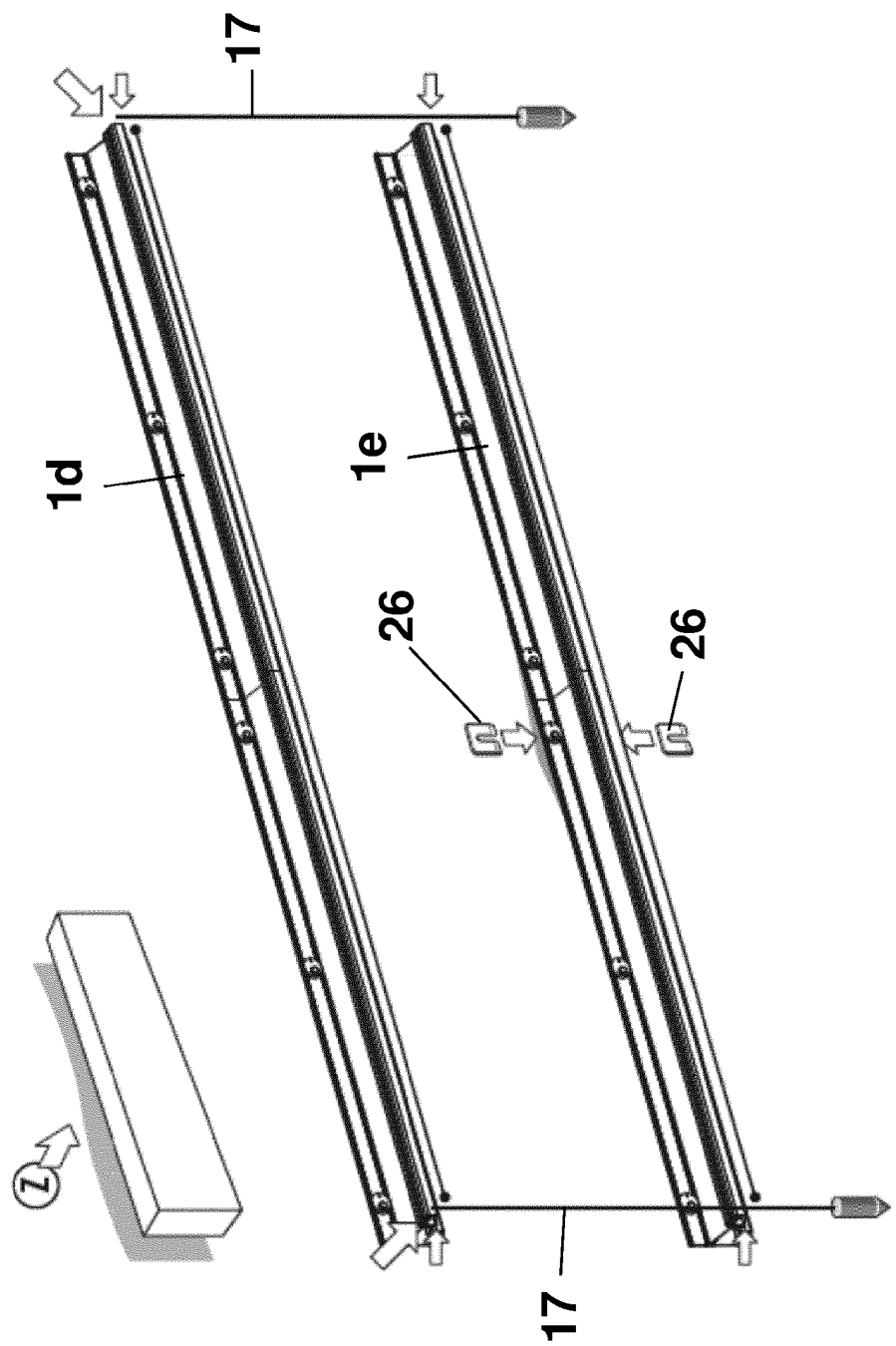

FIG. 4 demonstrates the adjustment possibilities with the support bracket of the invention;

FIG. 5 shows the use of spacers to compensate for unevenness of the wall; and

Figure 6:
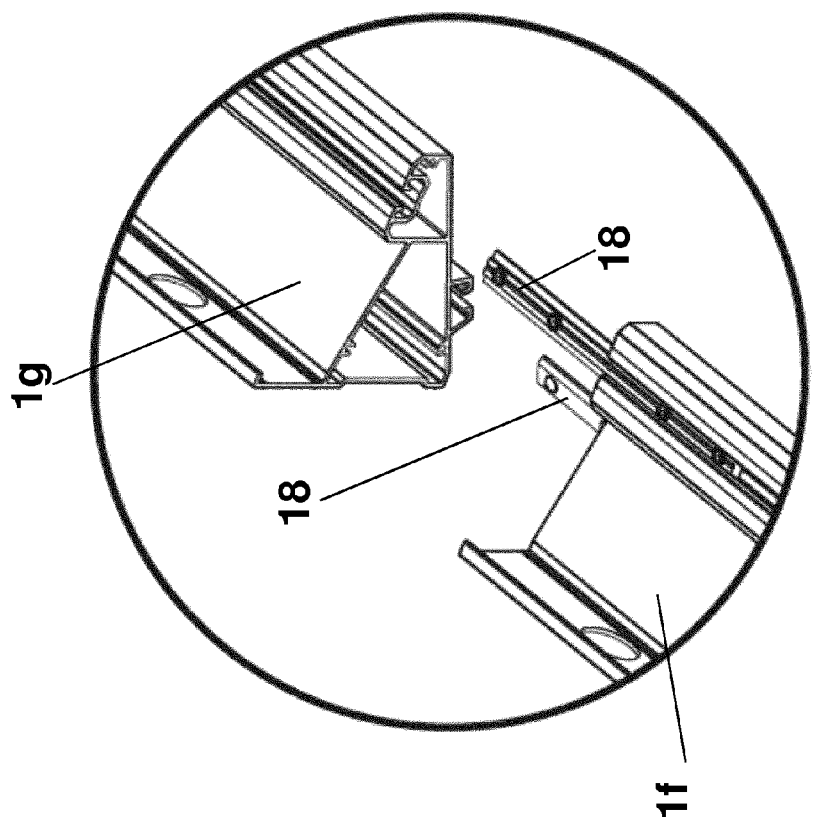

FIG. 6 shows the end of two adjacent support brackets and the interconnecting alignment members;

DETAILED DESCRIPTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Figure 3:
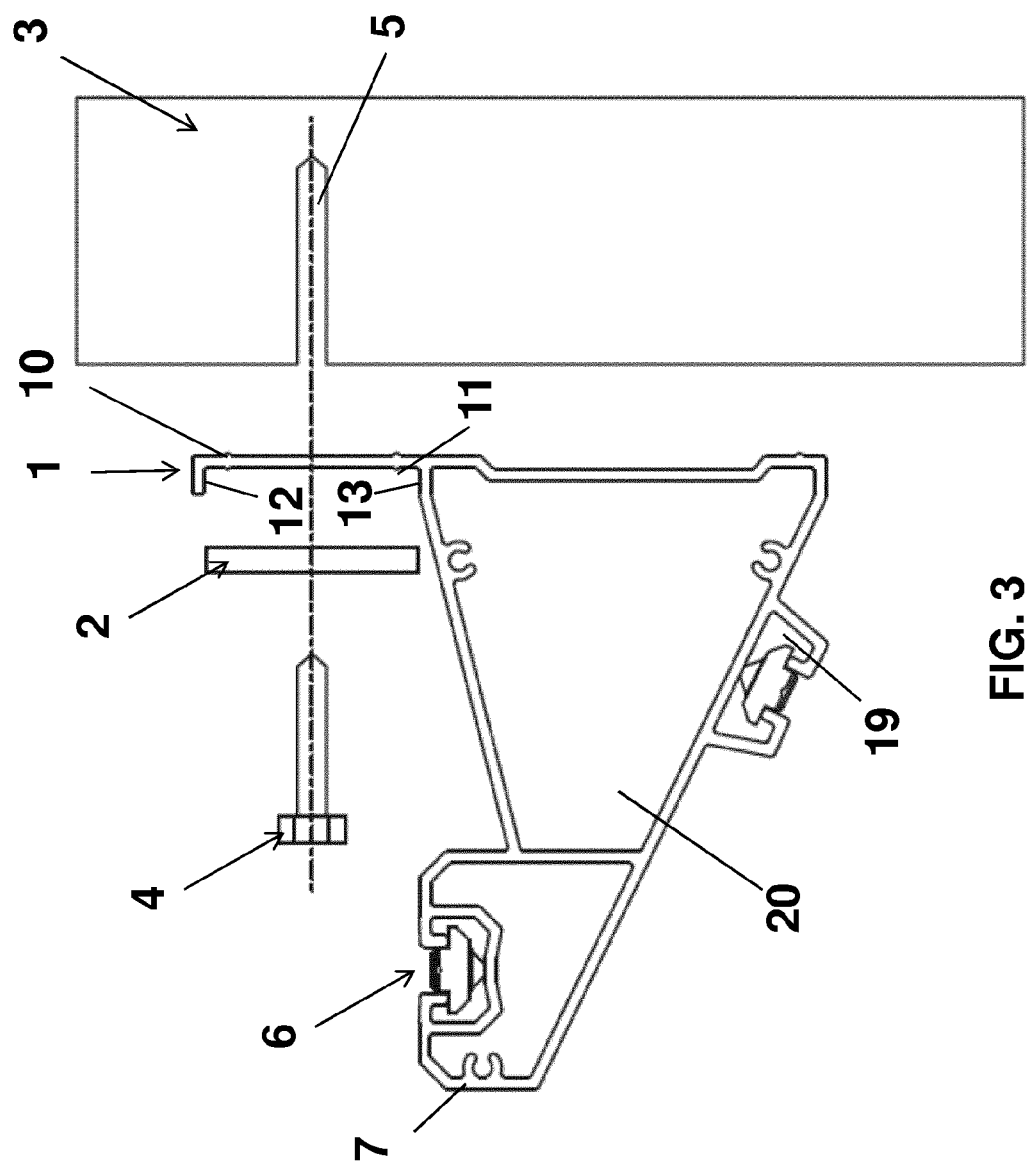
FIG. 3 shows a vertical sectional view through a wall during mounting of a support bracket of the invention.

In the following description, directional and orientational terms such as "top", "vertical", "upwards" etc. relate to the structure in its normal orientation of use as shown in FIG. 3, unless otherwise stated.

Figure 1:
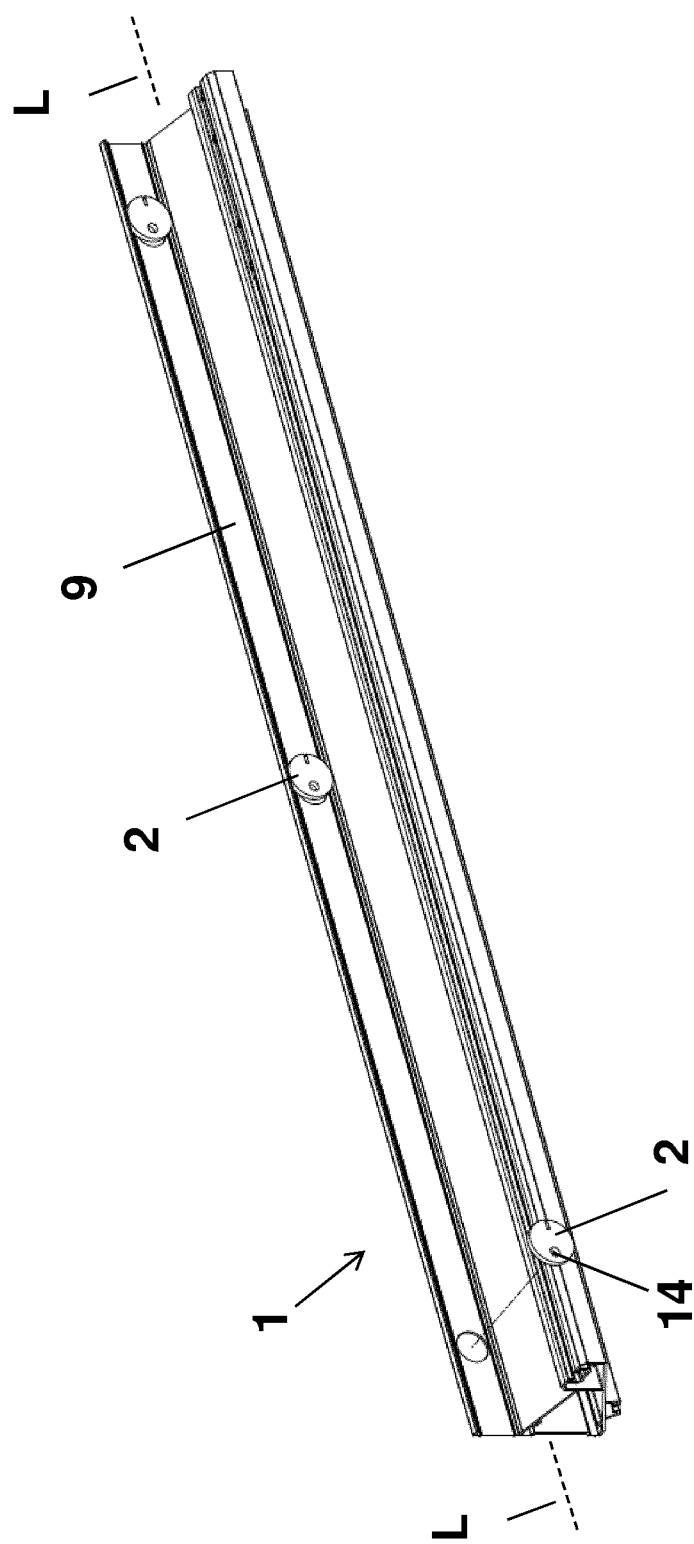
FIG. 1 shows a perspective view of a support bracket according to the present invention, the support bracket having three openings and three support elements.
Figure 2:
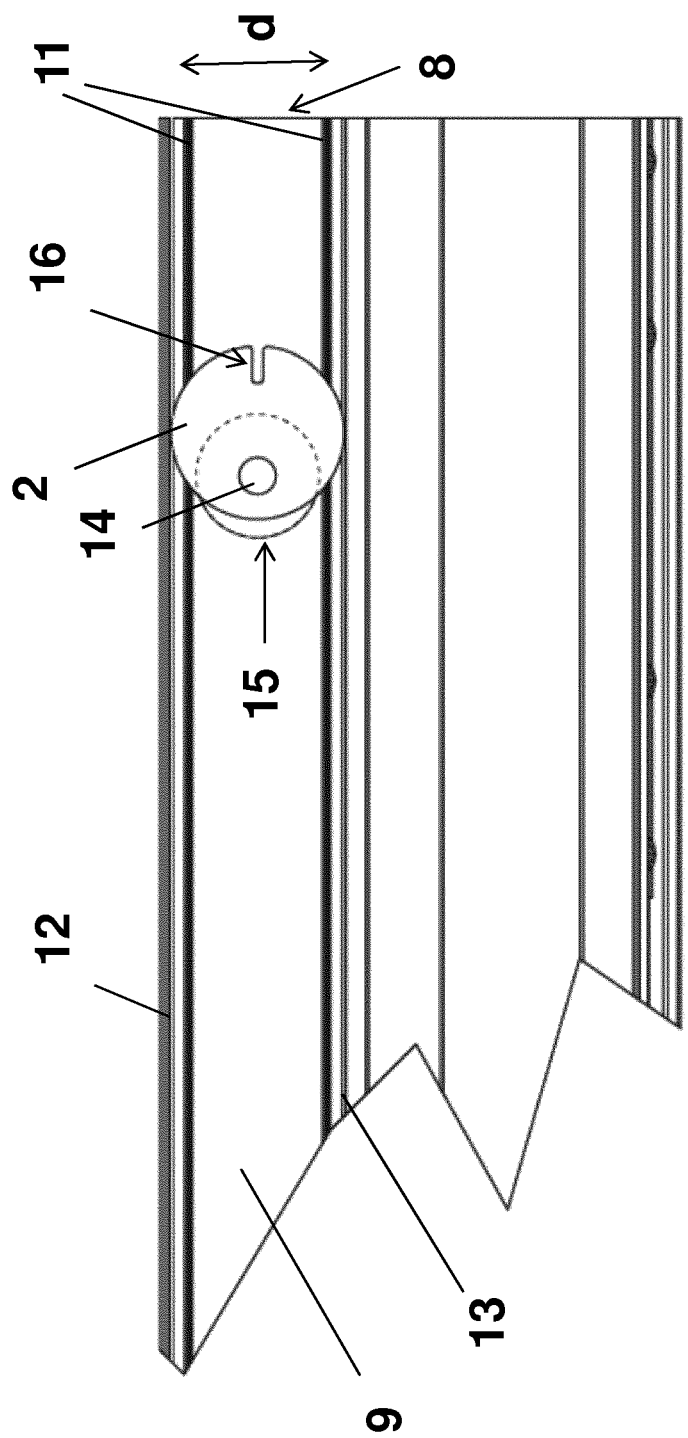
FIG. 2 shows a detailed view of part of the support bracket and a support element.

As shown in FIGS. 1-3, the support bracket 1 is designed to be fitted to a wall 3, and in particular to be secured to the wall by a plurality of fixings 4 by way of respective support elements 2. Each fixing 4 is secured into a hole 5 which has been formed (suitably drilled) into the wall 3. The present invention is designed to permit the accurate positioning of the support bracket 1 despite any incorrect positioning of the drilled hole 5.

The support bracket 1 can be any suitable type of supporting bracket or rail, but in this preferred embodiment is an extruded profile of aluminium. The support bracket 1 has a particular form which has been chosen to suit the article or articles (not shown) which are to be mounted thereupon. In this embodiment the support bracket 1 is designed to be mounted with its longitudinal axis L-L horizontal, and the articles are to be mounted by way of pegs (not shown) which are located at predetermined positions along the channel 6 in the upstanding rail 7.

It will be understood that for some articles which are to be mounted upon the support structure, an intermediate carrier (not shown) will be mounted upon the support bracket(s) 1 and then the article will be mounted upon the carrier. Whether or not an intermediate carrier is required will depend upon the article(s) being mounted, and does not affect the present invention.

The support bracket 1 has a channel 8 which accommodates the support element 2. The web 9 of the channel 8 in use provides a surface which is clamped to the wall 3. In this preferred embodiment the web 9 has two longitudinal formations 10 which create a line load and thereby increase the frictional engagement between the support bracket 1 and the wall 3. In addition, the web 9 has longitudinal formations 11 which increase the frictional engagement between the support bracket 1 and the support element 2. The formations 10 and 11 therefore impede the relative movement of the support bracket 1 once it is fixed to the wall 3 and the fixings 4 have been at least partially tightened.

The channel 8 also has a support surface 12 and a secondary surface 13. The separation between the support surface 12 and the secondary surface 13 corresponds to the diameter d of the support element 2, which is circular in this embodiment. Accordingly, the support element 2 can be located within the channel 8, with its periphery engaging both of the support surface 12 and the secondary surface 13, regardless of the orientation of the support element 2.

It will be understood that in other embodiments the support element 2 is not circular, and for example is polygonal (such as octagonal), or oval. Whilst a non-circular support element is not preferred it could nevertheless be used with the present invention. With a non-circular support element the distance between the support surface 12 and the secondary surface 13 would preferably be designed to match the maximum dimension of the support element so that the support element could be rotated to any required orientation within the channel 8. In most orientations, the periphery of a non-circular support element would engage only the support surface 12 and would not also engage the secondary surface 13, the support bracket 1 being pressed by gravity so that the support surface 12 rests upon the periphery of the support element 2. The use of a circular support element 2 is preferred, however, as that provides a positive engagement of the support element 2 against the support surface 12 and the secondary surface 13, regardless of the orientation of the support element. This positive engagement acts to resist inadvertent movement of the support bracket 1 in the upwards and downwards directions.

As most clearly shown in FIGS. 1 and 2, the fixing hole 14 which is formed through the support element 2 is off-centre, whereby the distance between the centre of the fixing hole 14 and the periphery of the support element 2 is not uniform. The periphery of the support element 2 therefore forms a cam surface relative to the fixing 4.

It will be understood from FIG. 2 in particular that the opening 15 which is formed through the web 9 is considerably larger than the shaft of the fixing 4. The support bracket 1 therefore has considerable freedom of movement relative to a (partially-fitted) fixing 4 in the plane parallel to the wall 3. Alternatively stated, the opening 15 provides the installer with considerable latitude in drilling the holes 5, and the support bracket 1 can be accurately mounted provided that the drilled hole lies anywhere within the projection of the opening 15 when the support bracket 1 is correctly positioned.

The fixing hole 14 is sized to closely accommodate the fixing 4, and in particular is smaller than the head of the fixing. It will be understood that the first function of the support element 2 is as a washer to span the opening 15 and enable the fixing 4 to clamp the web 9 of the support bracket 1 against the wall 3.

The off-centre positioning of the fixing hole 14 provides the second function of the support element 2, namely the adjustment of the (vertical) position of the support bracket 1 relative to the fixing 4. It will be understood that by rotating the support element 2 around the fixing 4, the vertical (and also horizontal) position of the support bracket 1 relative to the fixing 4 can be adjusted.

A slot-shaped cut-out 16 is provided in the support element 2, which cut-out can accommodate the blade of a screwdriver or the like which can be used to rotate the support element 2 around the fixing 4. In this embodiment the cut-out meets the periphery of the support element 2, but that is not necessarily the case, and in other embodiments the slot-shaped cut-out is provided within the body of the support element. The shape of the cut-out can vary to meet different types of tools e.eg torx-slot For brevity, the support element 2 is stated to be "circular" despite the discontinuity in its periphery caused by the cut-out 16.

The support element 2 thereby enables the vertical and horizontal (y- and x-direction) adjustment, and the subsequent fixation, of the support bracket 1. The support element 2 is preferably a relatively thick disc (perhaps 4-5 mm thick) and is made from metal such as aluminium or steel so that it can withstand the loading applied by the fixing 4 without breakage or significant deformation.

In the preferred embodiment shown in which the support element 2 is circular, its periphery enables a gradual or continuously variable adjustment of the vertical (y-direction) position of the support bracket 1. It will be understood that a less-preferred polygonal support element will provide incremental adjustment.

Notwithstanding that rotation of the support element will also cause corresponding adjustment of the support bracket 1 in the direction of its longitudinal axis L-L (x-direction), it is preferred that adjustment in the x-direction is effected by sliding the support bracket 1 longitudinally (i.e. with the fixing 4 moving across the opening 15. This is because the positioning of the support bracket 1 in the x-direction is typically less important than its positioning in the y-direction. It is therefore preferred that the fine adjustment which is available by way of rotation of the support element 2 be used primarily for adjustment in the vertical (y-) direction.

The number of support elements 2 which are used with a particular support bracket 1, and the spacing between the openings 15 along the support bracket 1, can be varied to suit the application, and in particular to suit the weight of the articles which are to be mounted upon the support bracket.

A single support bracket 1 may be sufficient for some applications. In applications using a single short support bracket it might be acceptable to secure one end of the support bracket by a conventional fixing and to utilise the present invention to adjust the position (height) of the other end of the support bracket. It is expected, however, that most applications will utilise multiple support elements for each support bracket.

The invention provides for the highly accurate positioning of a support bracket 1, including the highly accurate levelling of a support bracket which is intended to be horizontal. It furthermore provides for the highly accurate fixation of an array of separate or interconnected support brackets on a wall, whilst using relatively few parts and avoiding complicated fixtures and methodology.

It will be understood that if each support bracket in an array of support brackets is accurately positioned, the articles which are mounted thereupon can be similarly accurately positioned, without having to adjust the individual articles, and without having to interconnect the individual articles to ensure their relative alignment.

The method of mounting the support structure is relatively easy to carry out, including by a relatively unskilled and inexperienced installer. When used for displays comprising an array of television screens the relative positions of the television screens can be accurately controlled, and the gaps between adjacent television screens can be small and uniform.

In order to generate an accurate positioning and fixation of a support bracket 1 to a wall 3 all of the manufacturing tolerances must be accommodated and compensated for. The tolerances typically comprise:

The tolerance in the position of the opening 15 in the support bracket 1.

The tolerance in the diameter of the fixing hole 14 of the support element 2.

The tolerance in the diameter of the shaft of the fixing 4.

The tolerance in the periphery of the support element 2.

The tolerance in the position of the drilled holes 5 in the wall 3.

As above indicated, the tolerance in the position of the drilled holes 5 in the wall 3 is likely to be the largest single factor which needs to be compensated for, and is the only one of these tolerances which is outside the control of the manufacturer of the support structure.

FIG. 4 shows a few of the possible adjustment scenarios which are facilitated by the invention. The first or top-most example demonstrates that the height of the left-hand end of the support bracket 1 can be fixed in position by way of the support element 2*a*, and the height of the right-hand end can then be adjusted by way of the support elements 2*b* and 2*c*. The fine adjustment of the height of the right-hand end of the support bracket 1*a* which is provided by the invention has a consequent effect upon the longitudinal adjustment as shown by the longitudinal arrow.

The second example shows that the vertical position of the support bracket 1*b* can be adjusted directly by lifting (or lowering) the support bracket. Such adjustment will cause corresponding rotation of the support elements 2*d-f*, and might be used for initial rough adjustment before fine adjustment is undertaken by rotating the support elements as shown in the third example.

The third example shows the fine adjustment in the position of the support bracket 1*c* in the x- and y-directions by way of the rotation of the support elements 2*h-i*.

It will be understood that all of the adjustments shown in FIG. 4 should be undertaken with the fixings 4 tightened sufficiently to hold the support bracket 1 in position relative to the wall 3, but loose enough to permit the desired movement (e.g. the desired rotation of the support elements 2). This will be achieved in practice by partial tightening of the fixings 5, the fixings 5 being fully tightened once the support bracket 1 is accurately positioned.

In addition to the adjustments in the plane parallel to the plane of the wall 3 (i.e. in the x- and y-directions), the installer will typically also need to deal with a lack of flatness of the wall 3. It will be understood that the support brackets 1 are manufactured to be substantially linear in the direction of the longitudinal axis L-L. However, it might be possible to distort the support bracket 1 by tightening it against an uneven wall. Clearly, any distortion of the support bracket 1 could lead to a poorly fitting article and is to be avoided where possible. It is therefore desirable to fit a spacer into any gap which is present between the support bracket 1 and the wall 3 (particularly any gap adjacent to a fixing 4), rather than distort the support bracket into that gap.

Adjustment in the direction perpendicular to the wall 3 (in the z-direction) can be achieved by the use of a spacer element 26 as is commonly used for this purpose in the building industry (one suitable spacer 26 being sold under the trade name "Millimax", which is provided in a range of different thicknesses). Any gaps which are present between the support bracket 1 and the wall 3 adjacent to the fixings 4 are filled using the suitable spacers as demonstrated in FIG. 5. FIG. 5 also demonstrates the use of plumb lines 17 which can serve to identify undulations in the wall where spacers are required, and also to align the adjacent support brackets 1d and 1e relative to one another. (It is understood that many walls are substantially uneven, with undulations of up to 10 mm in the z-direction for every meter across a wall being commonplace).

This invention deals with all of the above tolerance issues and supports the installer in providing an accurate array of support brackets 1, and thereby a structural skeleton comprising one or more support brackets, for the articles. The installation designer can therefore design a display system (for example) at a reasonable cost, in the expectation that expensive installation adjustments can be avoided.

FIG. 6 shows two alignment members 18 which can be used to align adjacent support brackets 1f and 1g. In particularly large displays it might not be possible to provide support brackets 1 which are long enough to accommodate all of the articles, and in such applications two (or more) support brackets 1 must be joined together end to end. The channel 6 of the support bracket accommodates one of the alignment members 18, and a similarly-formed alignment channel 19 accommodates the other alignment member 18. Two alignment members 18 are preferred, but it will be understood that in alternative embodiments only one, or more than two, alignment members may be used, in respective alignment channels.

As shown in FIG. 3, the support bracket 1 includes a box section 20 which is generally closed, but which has openings (not shown) at periodic intervals along its length, the openings being provided for electrical cabling. In embodiments in which the mounted articles are electrically operated, most of the cabling can thereby be located within the box section 20, and be obscured from view and protected from accidental damage.

It has been found that the support structure provided by the present invention is substantially unaffected by temperature variations, such as might be caused by a display of articles such as televisions. Thermal variations do not adversely affect the mounting, nor therefore the correct positioning, of the support brackets 1.

It will be understood that the mounted support brackets 1 are easily accessible from the direction facing the wall 3, and thereby facilitate easier mounting of the chosen articles. The support structure is relatively simple and inexpensive, and is seamless in that it can be invisible in use and permit close fitting of the mounted articles.

It is intended that the support structure is permanently secured to the wall 3, i.e. it is not intended that the support brackets 1 be temporarily secured and then later removed for subsequent re-use. Nevertheless, the removal and possible re-use of the support brackets 1 is possible if desired.

The invention may also be used with articulated or angled articles such as those described in our application WO2010/094712.

What is claimed is:

1. A support structure, comprising: a support bracket, the support bracket having at least one opening, the opening being sized to accommodate a fixing by which the support bracket may be secured to a wall, the opening being larger than the fixing whereby the position of the support bracket may be adjusted relative to the fixing; a support element, the support element having a dimension which is larger than the opening, the support element having a fixing hole therethrough, the distance between the fixing hole and the periphery of the support element being non-uniform; the support bracket having a support surface adapted for engagement by the periphery of the support element, wherein the support bracket has a plurality of openings and a corresponding number of support elements and fixings, a channel being arranged in the support bracket and providing the support surface and a secondary surface spaced from the support surface, the support elements being designed to lie within the channel, the support bracket being an aluminum extrusion.

2. A support structure according to claim 1 in which the separation between the support surface and the secondary surface of the channel corresponds to the diameter of the support elements.

3. A support structure according to claim 2 in which the support elements have a formation for accommodating a tool for rotating the support elements relative to their fixing.

4. A support structure according to claim 3 in which the support bracket has formations adapted to increase the friction between one of the support bracket and the wall in use and the support elements in use.

5. A support structure according to claim 2 in which the support bracket has formations adapted to increase the friction between one of the support bracket and the wall in use and the support elements in use.

6. A support structure according to claim 1 in which the support elements have a formation for accommodating a tool for rotating the support elements relative to their fixing.

7. A support structure according to claim 6 in which the support bracket has formations adapted to increase the friction between one of the support bracket and the wall in use and the support elements in use.

8. A support structure according to claim 1 including at least one spacer adapted to lie between the support bracket and the wall in use.

9. A support structure, comprising: a support bracket, the support bracket having at least one opening, the opening being sized to accommodate a fixing by which the support bracket may be secured to a wall, the opening being larger than the fixing whereby the position of the support bracket may be adjusted relative to the fixing; a support element, the support element having a dimension which is larger than the opening, the support element having a fixing hole therethrough, the distance between the fixing hole and the periphery of the support element being non-uniform; the support bracket having a support surface adapted for engagement by the periphery of the support element, wherein the support bracket has a plurality of openings and a corresponding number of support elements and fixings, a channel being arranged in the support bracket and providing the support surface and a secondary surface spaced from the support surface, the support elements being designed to lie within the channel, the support bracket being an aluminium extrusion.

10. A support structure according to claim 9 in which the support bracket has formations adapted to increase the friction between one of the support bracket and the wall in use and the support elements in use.

11. A support structure according to claim 9 including at least one spacer adapted to lie between the support bracket and the wall in use.

12. A support structure, comprising: a support bracket, the support bracket having at least one opening, the opening being sized to accommodate a fixing by which the support bracket may be secured to a wall, the opening being larger than the fixing whereby the position of the support bracket may be adjusted relative to the fixing; a support element, the support element having a dimension which is larger than the opening, the support element having a fixing hole therethrough, the distance between the fixing hole and the periphery of the support element being non-uniform; the support bracket having a support surface adapted for engagement by the periphery of the support element, wherein the support bracket has a plurality of openings and a corresponding number of support elements and fixings, a channel being arranged in the support bracket and providing the support surface and a secondary surface spaced from the support surface, the support elements being designed to lie within the channel, the support bracket brine an aluminium extrusion.

13. A support structure according to claim 12 including at least one spacer adapted to lie between the support bracket and the wall in use.

14. A method of mounting a support structure to a wall, the method comprising the steps of:
(i) providing a support bracket, the support bracket having at least one opening, the at least one opening being sized to accommodate a fixing by which the support bracket may be secured to the wall, the wall defining a vertical direction, the at least one opening being larger than the fixing whereby the position of the support bracket may be adjusted relative to the fixing, the support bracket having a support surface adjacent to the opening, the support surface extending in a horizontal direction;
(ii) providing a support element for the at least one opening, the support element having a dimension which is larger than the opening, the support element having a fixing hole therethrough, the distance between the fixing hole and the periphery of the support element being non-uniform;
(iii) forming a number of holes in the wall substantially at predetermined positions;
(iv) locating the support bracket upon the wall, with the at least one opening overlying a respective hole;
(v) locating the support element adjacent to the support bracket with the fixing hole aligned with the opening, and with an outer and upper part of the periphery of the support element engaging with the support surface;
(vi) passing a fixing through the fixing hole and into a respective formed hole and partially tightening the fixing;
(vii) rotating the support element around the fixing whereby to adjust the position of the support bracket in the plane parallel to the wall; and
(viii) tightening the fixings to secure the support bracket to the wall.

15. The method of mounting a support structure according to claim 14 which includes the additional step of fitting at least one spacer between the support bracket and the wall.

16. The method of mounting a support structure according to claim 15 in which steps (i) to (viii) are repeated for subsequent support brackets thereby to form an array or network of support brackets.

17. A method for aligning a support structure on a wall, comprising a support structure and at least one support element, said support having at least one opening, and a support surface and a secondary surface being separated by the maximum dimension of a support element, the at least one support element having a fixing hole, the method comprising the steps of:
for each support element, placing it between the support surface and the secondary surface over an opening,
passing a fixing through the fixing hole of the support element and the opening of the support structure and partially tightening the fixing of the support element to the wall,
moving the support bracket horizontally and/or vertically around the at least one support element, and
fully tightening the fixings of the support element.

18. The method according to claim 17 wherein moving the support bracket comprising rotating at least one support element around its fixing element.

* * * * *